(12) United States Patent
Rajasekharan et al.

(10) Patent No.: US 11,169,112 B2
(45) Date of Patent: Nov. 9, 2021

(54) PH MEASUREMENT OF AN AQUEOUS SAMPLE

(71) Applicant: Hach Company, Loveland, CO (US)

(72) Inventors: Vishnu Rajasekharan, Fort Collins, CO (US); David L. Rick, Longmont, CO (US)

(73) Assignee: HACH COMPANY, Loveland, CO (US)

( * ) Notice: Subject to any disclaimer, the term of this patent is extended or adjusted under 35 U.S.C. 154(b) by 40 days.

(21) Appl. No.: 16/428,727

(22) Filed: May 31, 2019

(65) Prior Publication Data

US 2019/0369045 A1    Dec. 5, 2019

Related U.S. Application Data

(60) Provisional application No. 62/678,449, filed on May 31, 2018.

(51) Int. Cl.
 *G01N 27/416* (2006.01)
 *G01N 27/30* (2006.01)
(52) U.S. Cl.
 CPC ....... *G01N 27/4167* (2013.01); *G01N 27/308* (2013.01)
(58) Field of Classification Search
 CPC ............. G01N 27/4167; G01N 27/308; G01N 27/302; G01N 27/36
 See application file for complete search history.

(56) References Cited

U.S. PATENT DOCUMENTS

| | | | |
|---|---|---|---|
| 3,709,796 A | * | 1/1973 | Arrington .......... G01N 27/4166 205/782 |
| 4,818,361 A | | 4/1989 | Burgess et al. |

(Continued)

FOREIGN PATENT DOCUMENTS

WO        9222811 A1   12/1992

OTHER PUBLICATIONS

Ayres, Development of a boron doped diamond pH electrode—improving on current pH sensing technologies , https://www.swig.org.uk/wp-content/uploads/2017/10/Zoe-Ayres-2017-to-publish.pdf (Year: 2017).*

(Continued)

*Primary Examiner* — Patrick Assouad
*Assistant Examiner* — Demetrius R Pretlow
(74) *Attorney, Agent, or Firm* — Ference & Associates LLC

(57) ABSTRACT

An embodiment provides a method for measuring pH in an aqueous sample with a frit-less electrode, including: introducing an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode; measuring a first electrical potential between the first measurement electrode and the ground rod electrode in the aqueous sample; measuring a second electrical potential between the second measurement electrode and the ground rod electrode in the aqueous sample; and identifying a pH of the aqueous sample based upon a difference between the first electrical potential and the second electrical potential. Other aspects are described and claimed.

18 Claims, 8 Drawing Sheets

(56) References Cited

U.S. PATENT DOCUMENTS

| | | | | |
|---|---|---|---|---|
| 4,851,104 A | * | 7/1989 | Connery | G01N 27/4035 204/406 |
| 4,961,163 A | * | 10/1990 | Bryan | G01N 27/4167 204/401 |
| 5,925,572 A | * | 7/1999 | Byrne | G01N 21/272 324/438 |
| 2002/0079901 A1 | * | 6/2002 | Rezvani | G01N 27/4165 324/426 |
| 2002/0171430 A1 | * | 11/2002 | Gehrke | G01N 27/4167 324/438 |
| 2003/0132755 A1 | * | 7/2003 | Feng | G01N 27/4035 324/438 |
| 2005/0137118 A1 | * | 6/2005 | Silveri | C02F 1/008 510/514 |
| 2008/0034845 A1 | * | 2/2008 | Morris | G01N 21/78 73/61.41 |
| 2009/0194427 A1 | * | 8/2009 | Hsiung | G01N 27/4035 205/414 |
| 2010/0151479 A1 | | 6/2010 | Toumazou et al. | |
| 2012/0091008 A1 | | 4/2012 | Muir et al. | |
| 2014/0262779 A1 | * | 9/2014 | King | G01N 27/302 204/406 |
| 2014/0332398 A1 | | 11/2014 | Lawrence et al. | |
| 2015/0276662 A1 | * | 10/2015 | Horkheimer | G01N 27/4167 205/789 |
| 2016/0041113 A1 | * | 2/2016 | Pagani | G01N 27/223 324/694 |
| 2020/0268292 A1 | * | 8/2020 | Morgan | A61B 5/14539 |

OTHER PUBLICATIONS

International Searching Authority, Notification of Transmittal of the International Search Report and the Written Opinion of the International Searching Authority, or the Declaration, dated Aug. 13, 2019, p. 15.

J. Ayres et al, "Controlled sp2 Functionalization of Boron Doped Diamond as a Route for the Fabrication of Robust and Nernstian pH Electrodes" ,Analytical Chemistry, vol. 88, No. 1, Jan. 5, 2016, pp. 974-980.

International Bureau, Notification Concerning Transmittal of International Preliminary Report on Patentability, dated Dec. 10, 2020, p. 10.

* cited by examiner

PH MEASUREMENT OF AN AQUEOUS SAMPLE

CROSS REFERENCE TO RELATED APPLICATION

This application claims priority to Provisional Patent Application Ser. No. 62/678,449, filed on 31 May 2018, and entitled pH MEASUREMENT OF AN AQUEOUS SAMPLE, the content of which is incorporated by reference herein.

FIELD

This application relates generally to pH measurement of an aqueous sample, and, more particularly, to pH measurement using electrodes without a frit and internal reference solution.

BACKGROUND

Ensuring water quality is critical to the health and well-being of humans, animals, and plants, which are reliant on water for survival. One parameter of water that may be measured is the pH. The measurement of pH of an aqueous sample is critical in a number of industries such as pharmaceuticals, biomedical, water supply, and other manufacturing fields. Measurement of pH may allow for proper treatment of water or ensuring proper water quality for sensitive purposes, and allows for identifying the overall quality of the water. One method to measure pH in an aqueous sample includes the use of electrodes which require constant maintenance and calibration of the pH measurement system.

BRIEF SUMMARY

In summary, one embodiment provides a method for measuring pH in an aqueous sample with a frit-less electrode, comprising: introducing an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode; measuring a first electrical potential between the first measurement electrode and the ground rod electrode in the aqueous sample; measuring a second electrical potential between the second measurement electrode and the ground rod electrode in the aqueous sample; and identifying a pH of the aqueous sample based upon a difference between the first electrical potential and the second electrical potential.

Another embodiment provides a measurement device for measuring pH in an aqueous sample with a frit-less electrode, comprising: at least one chamber; one or more series of electrodes at least partially disposed within the at least one chamber; a processor; and a memory device that stores instructions executable by the processor to: introduce an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode; measure a first electrical potential between the first measurement electrode and the ground rod electrode in the aqueous sample; measure a second electrical potential between the second measurement electrode and the ground rod electrode in the aqueous sample; and identify a pH of the aqueous sample based upon a difference between the first electrical potential and the second electrical potential.

A further embodiment provides a product for measuring pH in an aqueous sample with a frit-less electrode, comprising: a storage device having code stored therewith, the code being executable by the processor and comprising: code that introduces an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode; code that measures a first electrical potential between the first measurement electrode and the ground rod electrode in the aqueous sample; code that measures a second electrical potential between the second measurement electrode and the ground rod electrode in the aqueous sample; and code that identifies a pH of the aqueous sample based upon a difference between the first electrical potential and the second electrical potential.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
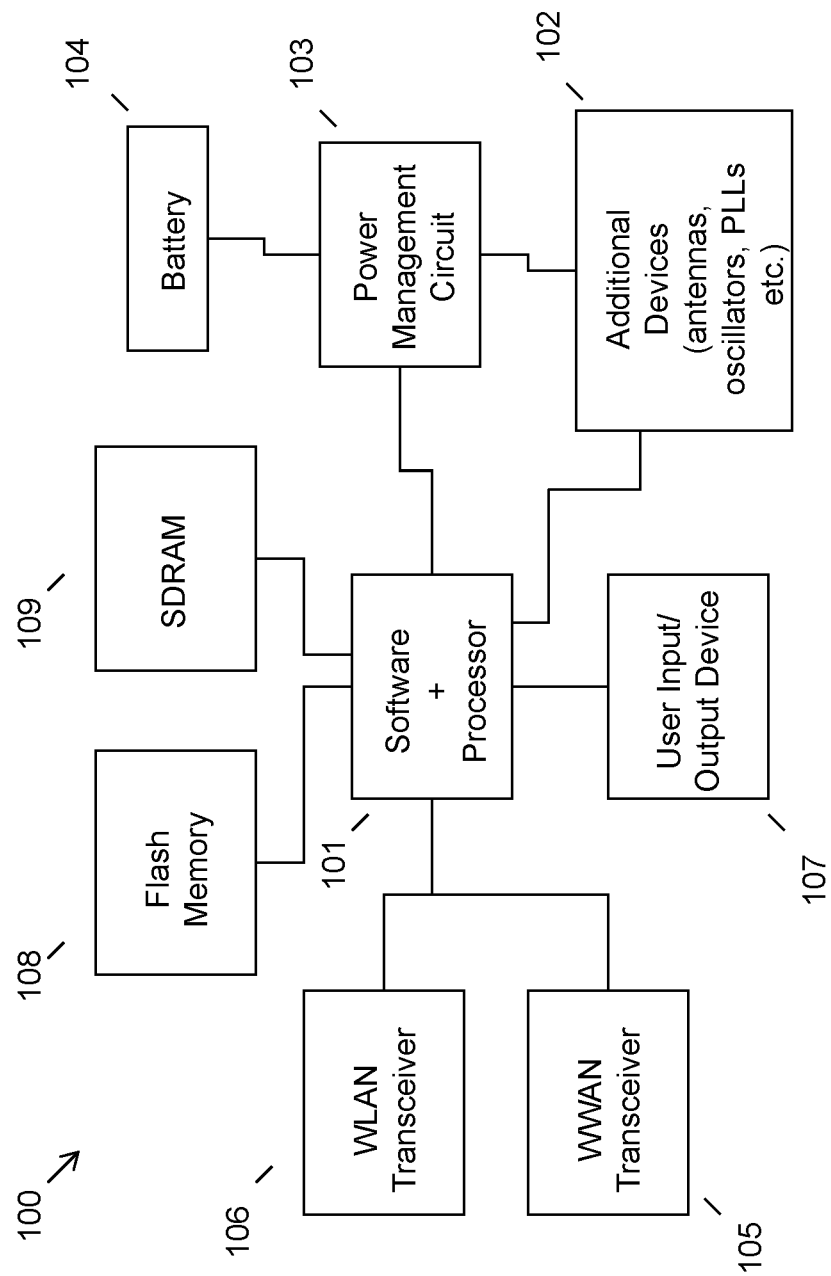
FIG. 1 illustrates an example of computer circuitry

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

The measurement of the pH of water or other aqueous solutions or samples is very common and allows for determination of the quality or other characteristics of the aqueous solution. Conventional pH measurement instruments are available; however, these instruments are complex, and require constant maintenance and calibration. For example, traditional pH measurements use a pH electrode that is introduced into an aqueous sample. To measure the pH of the sample, the pH electrode includes an internal solution that is used as a reference for the measurements taken within the aqueous sample. Thus, the conventional pH measurement devices require that a user manually add the internal solution to the electrode.

The internal solution that is used in conventional pH measurement electrodes is often a high molar potassium chloride solution. Many pH electrodes contain a filling port for the internal or reference solution that must be closed to prevent evaporation of the reference solution. Failure to close this port leads to evaporation and an increase in the molarity of the internal reference solution. This rise in molarity can alter the sensitivity of the pH electrode and also lead to crystallization of salts in the pH electrode, thereby damaging the electrode.

Additionally, conventional pH electrodes contain a frit. The frit serves as an electrically conductive "wick" between the electrode filing solution and the aqueous sample to be measured. The frit allows electrical conductivity while keeping the internal solution and aqueous sample as separate volumes. This frit requires maintenance, such as cleaning of the frit to prevent fouling. If the frit fouls the electrode would require recalibration and maintenance. Additionally, the frit is susceptible to drying out. Thus, the conventional pH measurement electrodes need to be stored in an aqueous environment to minimize damaging the electrode by allowing the frit to dry. Failure to maintain a proper internal solution or frit can damage a pH electrode, lower the sensitivity, or render the electrode inoperative. Additionally, the frit and filling solution may cause junction potentials, which may affect the measurement of the pH electrode.

Additionally, conventional pH electrodes may be constructed using fragile, thin glass. This glass breaks easily leading to higher replacement and maintenance costs. Conventional pH electrodes also may have "alkali errors." These errors arise from interfering ions such as sodium and lithium affecting the pH response at high pH values. What is needed is a pH measurement electrode that requires less maintenance while maintaining the sensitivity of pH measurement.

Accordingly, the systems and methods described herein provide a technique for pH measurement using a frit-less and internal solution free electrode that is able to measure electrical signals and identify the portion of the electrical signal that is attributable to interferants and the electrical signal that is a result of the pH of the aqueous sample. Specifically, the systems and methods as described herein are able to identify an electrical potential of an aqueous sample using an electrode sensitive to interferants, and an electrode sensitive to both the interferants and the pH of an aqueous sample. In other words, in an embodiment, an electrode may be of a material sensitive to interferants and/or interferants and pH in an aqueous sample. For example, electrodes may comprise Sp2 and/or Sp3 carbon materials that can include diamond-like materials doped with elements like boron (BDD). In this case the first electrode includes a localized microelectrode or nanoelectrode array of SP2 carbon on the SP3 substrate that will be sensitive to interferants and pH, whereas the second electrode will be include SP3 substrate which will be sensitive to only interferants. Other materials may include metallic systems, where, in this case the first electrode includes localized iridium oxide micro or nano-electrodes on a conductive iridium metal substrate which would be sensitive to both pH and interferants, whereas the second electrode will be include just iridium metal which will be sensitive to only interferants.

Other proton sensitive/insensitive metal oxide/metal systems include tin, tungsten, palladium, rhodium, platinum, osmium, tantalum, vanadium. Other proton sensitive/insensitive carbonaceous systems include, modified CNT, graphene nanocellulose. By incorporating silicon oxide micro/nanostructures on conductive or semi-conductive silicon substrates, a first electrode glass system that is sensitive to interferants and pH can achieved. The second electrode will include just the silicon substrate without any silicon oxide which will be sensitive to interferants but not the pH, which will be a reference-free glass electrode. By taking both measurements, the system can subtract the measurement attributable to the interferants from the overall measurement to then identify the pH of the aqueous sample. To conduct these measurements the system may include a common ground electrode or reference electrode. Thus, the method may use a sequence of measurements as a means to quantify the interferant species.

The use of BDD serves as a better electrode material than other carbon-based or metallic materials (e.g., silver, gold, mercury, nickel, etc.) because these materials may eventually themselves become oxidized, thereby generating interfering signals and contributing to the errors in the measurement of pH. Thin film BDD electrodes may undergo thermal stress because of the different thermal expansion coefficients between the substrate and the BDD layer, which limits the current density that can be applied to these electrodes. Thick BDD solid electrodes do not have the substrate and therefore the structural and electrical integrity may be maintained at a higher current. The lack of substrate in the thick, solid, free-standing BDD electrode eliminates the problem of delamination that can occur on thin-filmed BDD materials. Thus, the electrodes used in the measurement device as described may be thick-filmed BDD electrodes.

In an embodiment, an aqueous sample may be introduced into a measurement chamber. Alternatively, the pH measurement apparatus may be introduced into an aqueous sample.

A first potential measured across a first electrode and a ground electrode may be measured. This first potential may be attributable to a measure of the interferants in the aqueous sample. A second potential measured across a second electrode and the ground electrode may be also measured. The ground electrode associated with the measurement of the second potential may be the same ground electrode used in measurement of the first potential. The second potential may be associated with both the interferants and a pH of the aqueous sample. In an embodiment, the first potential and second potential may be subtracted to remove an interferant component of the measurement to identify a pH of an aqueous sample. The method may therefore mathematically account for interferants by utilization of the two or more electrical responses to remove the charge delivered to interferant species that may result in false pH identification, without the use of an electrode including a frit or internal reference solution.

The illustrated example embodiments will be best understood by reference to the figures. The following description is intended only by way of example, and simply illustrates certain example embodiments.

While various other circuits, circuitry or components may be utilized in information handling devices, with regard to an instrument for pH measurement according to any one of the various embodiments described herein, an example is illustrated in FIG. 1. Device circuitry 100 may include a measurement system on a chip design found, for example, a particular computing platform (e.g., mobile computing, desktop computing, etc.) Software and processor(s) are combined in a single chip 101. Processors comprise internal arithmetic units, registers, cache memory, busses, I/O ports, etc., as is well known in the art. Internal busses and the like depend on different vendors, but essentially all the peripheral devices (102) may attach to a single chip 101. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 103, e.g., a battery management unit, BMU, which manage power as supplied, for example, via a rechargeable battery 104, which may be recharged by a connection to a power source (not shown). In at least one design, a single chip, such as 101, is used to supply BIOS like functionality and DRAM memory.

System 100 typically includes one or more of a WWAN transceiver 105 and a WLAN transceiver 106 for connecting to various networks, such as telecommunications networks and wireless Internet devices, e.g., access points. Additionally, devices 102 are commonly included, e.g., a transmit and receive antenna, oscillators, PLLs, etc. System 100 includes input/output devices 107 for data input and display/rendering (e.g., a computing location located away from the single beam system that is easily accessible by a user). System 100 also typically includes various memory devices, for example flash memory 108 and SDRAM 109.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform pH measurement of an aqueous sample.

Figure 2:
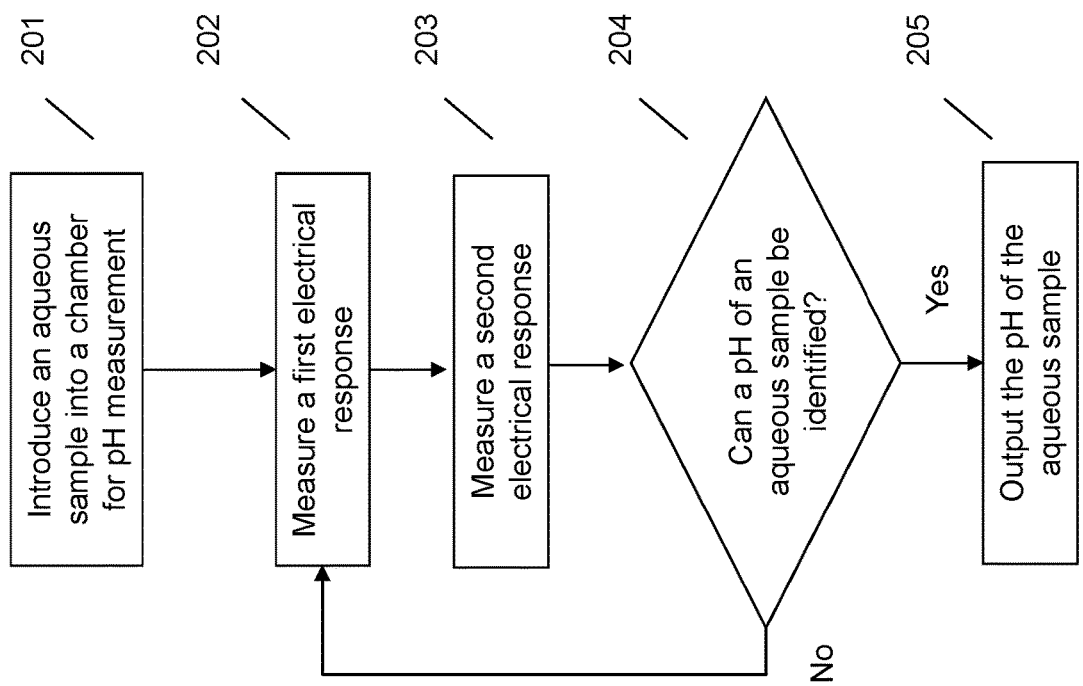
FIG. 2 illustrates a flow diagram of measuring pH in an aqueous sample.
Figure 3:
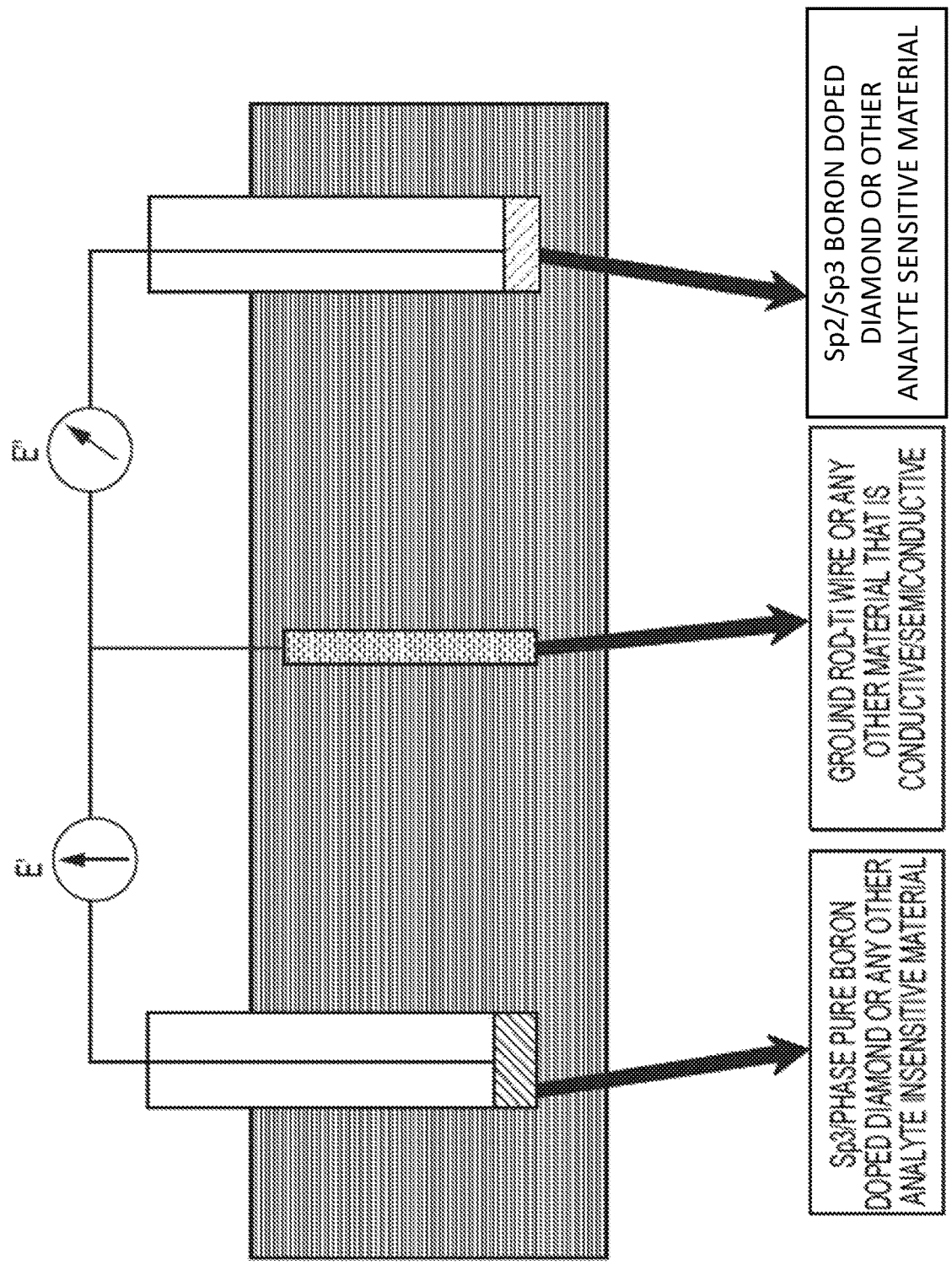
FIG. 3 illustrates a schematic diagram of measuring pH in an aqueous sample in an example embodiment.

Referring now to FIG. 2, an embodiment may measure pH in an aqueous solution using frit-less electrodes that do not require an internal reference solution. In other words, the electrodes do not require a filling solution, a frit, and are made of a material other than the fragile, thin glass of conventional electrodes. The systems and methods as described herein provide a technique for interferants-free measurement for pH that can be used in practice with actual aqueous samples without the recalibration and maintenance required by conventional systems, due to the removal of the components that cause maintenance requirements and calibration.

At 201, in an embodiment, the measurement apparatus may be introduced into an aqueous sample. Alternatively, an aqueous sample may be introduced into a test chamber, for example, a test chamber of a measurement device. If the aqueous sample is introduced into the measurement device, the aqueous sample may be placed or introduced into a test chamber manually by a user or using a mechanical means, for example, gravity flow, a pump, pressure, fluid flow, or the like. For example, a water sample for pH testing may be introduced to a measurement or test chamber using a pump. In an embodiment, valves or the like may control the influx and efflux of the aqueous solution into or out of the one or more chambers, if present. Once the sample is introduced to the measurement system, the system may measure the pH of the sample, using steps as explained in more detail below. In an embodiment, the measurement device may include one or more chambers in which the one or more method steps may be performed.

The measurement device may include at least three electrodes for measuring the pH of an aqueous sample. Accordingly, an embodiment may include a first measurement electrode, a second measurement electrode, and a ground (reference) electrode. The ground electrode may be shared by the first measurement electrode and the second measurement electrode. In other words, both the first and second measurement electrode may be electrically connected to the ground or reference electrode and the ground or reference electrode may be used by both measurement electrodes for completing the electrical circuit. In an embodiment, one or more measurement electrodes may be constructed of the same or different materials. For example, one measurement electrode may be constructed of a material that is insensitive to analytes, for example, Sp3/phase pure Boron doped diamond material, whereas a second measurement electrode may be constructed of a material that is sensitive to analytes, for example, Sp2/Sp3 Boron doped diamond or other carbon material.

In an embodiment, the electrodes may be fully or at least partially disposed in the volume of aqueous solution. For example, if the aqueous solution is introduced into a chamber having one or more electrodes, the aqueous solution may at least partially cover the one or more electrodes. As another example, the one or more electrodes may be partially disposed within the chamber with the other portion of the electrode outside the chamber. Thus, when the aqueous solution is introduced into the chamber it only covers the portion of the electrodes that are within the chamber.

At 202, in an embodiment, the system may measure a first electrical potential of the volume of aqueous solution in a chamber via application of an electrical signal across a first measurement electrode and the reference electrode. The use of the term "first" or "second" is not intended to designate either a temporal indication of when the measurement is taken or a location of one electrode with respect to another. Rather, the terms "first" and "second" are merely used to distinguish between two different electrodes.

The electrical signal may be applied using or across one or more electrodes, for example, a series of electrodes. In an embodiment, the first measurement electrode may be used to measure the electrical potential attributable to any interferants in the aqueous sample. Thus, the first measurement electrode may be constructed of an analyte insensitive material, for example, Sp3 boron doped diamond (BDD) electrode material. The Sp3BDD electrode may be alumina polished. The Sp3 BDD electrode may be phase pure. The Sp3 BDD electrode may be polarized, for example, using electrochemical procedures, to render a uniform, clean and homogenous substrate. This can be done in 0.1 M H2SO4 at 3V for 60 seconds. A Sp3 electrode may be insensitive to pH measurement alone. The particular pH insensitivity of the Sp3 BDD electrode may be due to the pH response of the electrode is within 4-5 mV/pH. Thus, this type of material is useful for measuring electrical potential that is independent of pH. Therefore, the resulting potential measurement is attributable to any interferants in the aqueous sample. The application of an electrical signal across the first electrode and the ground electrode allows for measurement of a first electrical potential may be measured across the first measurement electrode and ground electrode.

At 203, in an embodiment, the system may measure a second electrical potential of the volume of aqueous solution in a chamber via application of an electrical signal across a second measurement electrode and the ground electrode. The ground electrode used for the second measurement may be the same ground electrode used for the first measurement in order to ensure that the measurements are consistent and with reference to the same measurement. In other words, the use of a single ground electrode accounts for any noise or electrical imperfections that may be attributable to the ground electrode itself. As with the first measurement, the electrical signal for the second measurement may also be applied using one or more electrodes, for example, a series of electrodes.

In an embodiment, the second measurement electrode may be constructed of an analyte sensitive material, for example, Sp2/Sp3 boron doped diamond (BDD) electrode material. In an embodiment a controlled amount of Sp2 carbon (e.g., a non-diamond material such as glassy carbon containing Sp2 carbon, etc.) may be introduced into or onto the Sp3 BDD carbon, thereby creating a Sp2/Sp3 BDD electrode. For example, the Sp2 carbon may be introduced into the Sp3 BDD electrode using laser patterning, resulting in a polycrystalline boron doped diamond material that exhibits the benefits of glassy carbon electrode with respect to pH measurement while producing low background currents due to a BDD substrate. Introduction of the Sp2 carbon into the Sp3 BDD carbon may enable the measurement of pH. Thus, as opposed to the Sp3 BDD electrode, the Sp2/Sp3 electrode may be sensitive to pH. Therefore, the Sp2/Sp3 electrode may be sensitive to both interferants and pH. The introduction of the Sp2 may result in an electrode that can make a pH determination having a 58 mV/pH+/−5 mV sensitivity. Since the second measurement electrode is sensitive to analyte, the potential measured across the second measurement electrode and the ground electrode is attributable to not only the interferants in the sample, but also the pH of the sample.

In an embodiment, a first measuring electrode and a second measuring electrode may be used to measure a potential in an aqueous solution with reference to a ground electrode (ground rod or reference electrode). The ground electrode may be the same for both the first measuring electrode and the second measuring electrode. Use of a single ground rod with multiple measuring electrodes may compensate for electrical potential, conductivity, oxidation-reduction potential (ORP), or the like across multiple potential measurements of the aqueous sample. The ground electrode may contain or be made of titanium (Ti), platinum (Pt), or any other conductive metal that may not foul easily. In an embodiment, the one or more series of electrodes may be boron doped diamond (BDD) electrodes.

Figure 4:
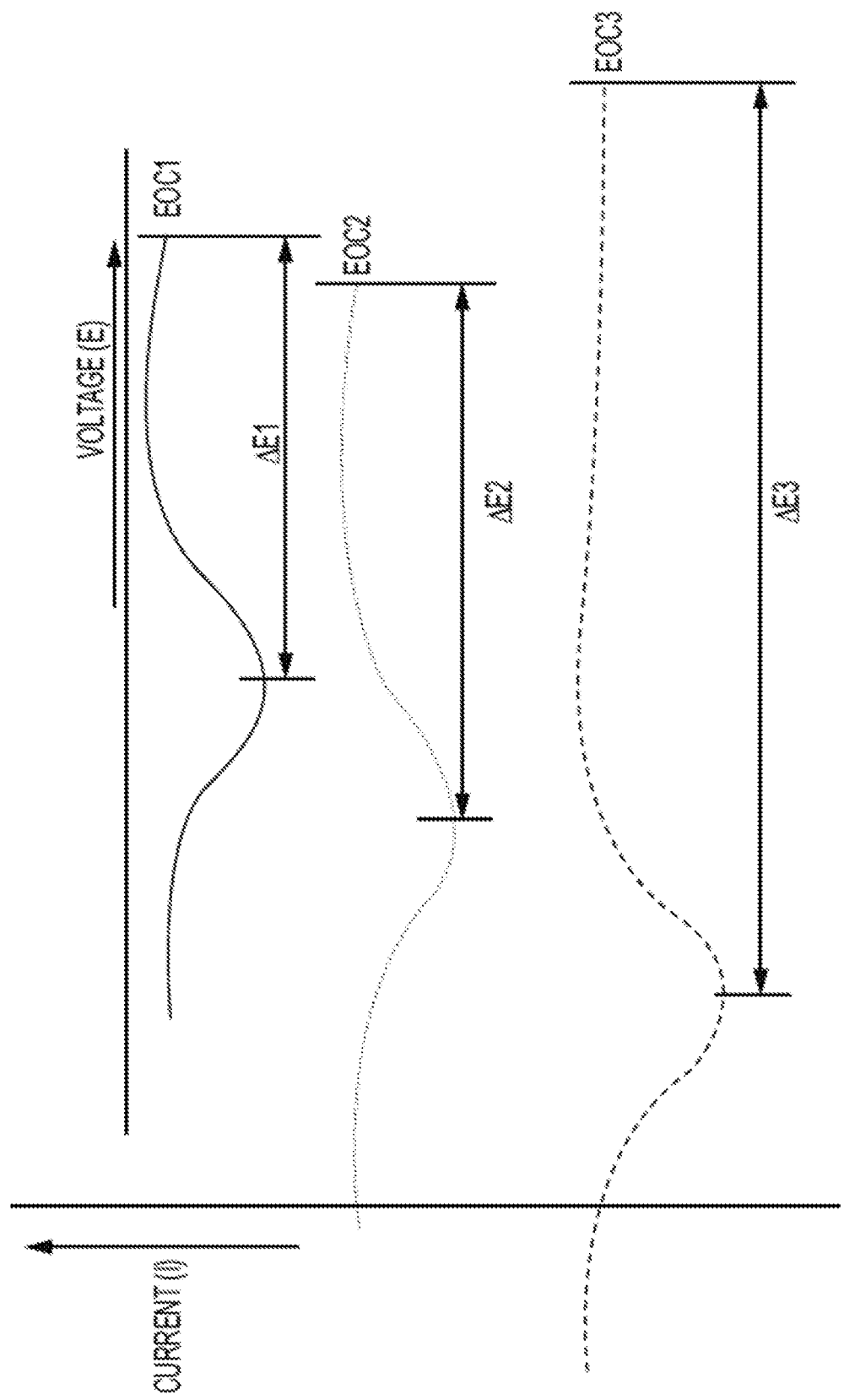
FIG. 4 illustrates an example measurement to determine the pH of an aqueous sample.
Figure 5:
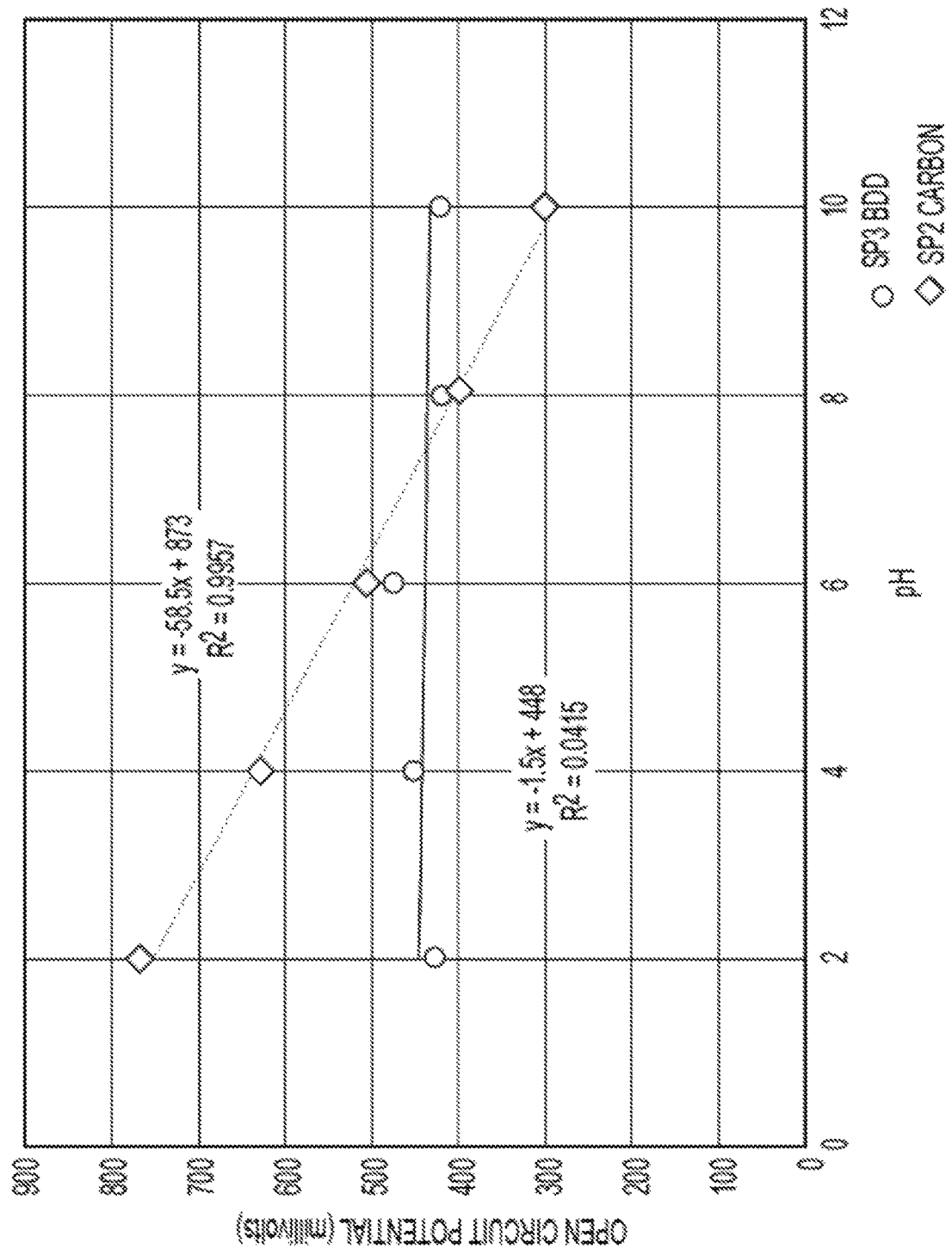
FIG. 5 illustrates an example of a differential pH internal reference in an aqueous sample.
Figure 6:
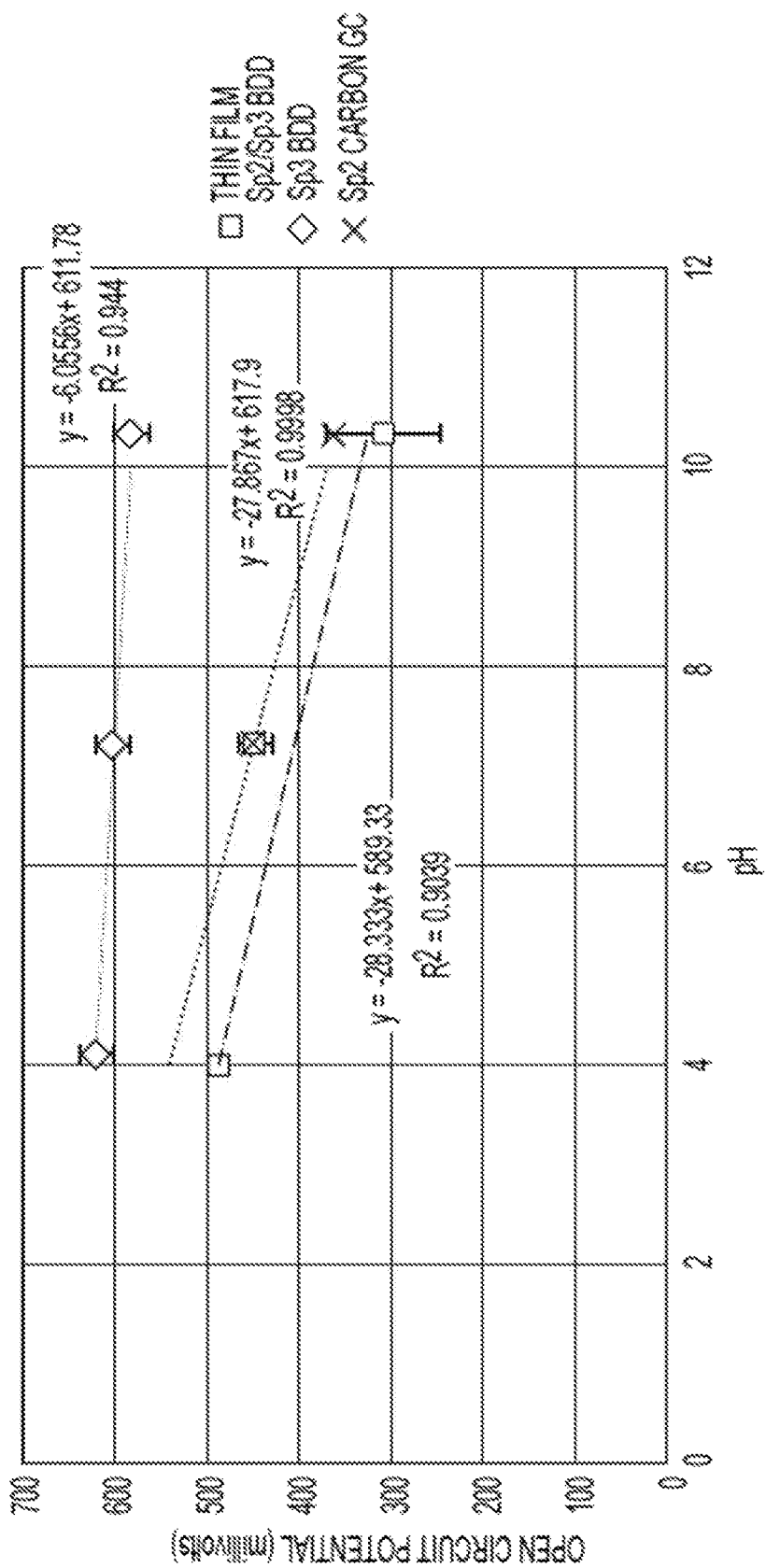
FIG. 6 illustrates example data of a differential pH internal reference in an aqueous sample.

At 204, the system may determine or identify a pH of the aqueous sample. To make this determination, the system may subtract the electrical potential associated with the interferants of the aqueous sample from the electrical potential associated with the interferants and pH to give a resulting pH of the aqueous sample. For example, the open circuit potential measured from the Sp3 BDD material may be the electrical potential associated with interferants minus the electrical potential of the ground. The open circuit potential measured from the Sp2/Sp3 material (BDD, glassy carbon, etc.) may be the electrical potential associated with both pH and interferants. Thus, in this example, to identify the electrical potential attributable to the pH of the sample, the measured electrical potential of measured at the first measurement electrode may be subtracted from the measured electrical potential measured at the second measurement electrode. For example, referring to FIG. 4, a voltammetry approach for determining a pH measurement may be used. For example, a scan for voltammetry may be commenced from the open circuit potential for each aqueous sample. The difference between a peak potential and a starting potential may identify a dependence of peak. A differential potential measured between the open circuit potential and the peak potential may eliminate the floating nature of the ground electrode itself. Examples of a method may be found in FIG. 5 and FIG. 6.

If the system cannot identify a pH of the aqueous solution, the system may continue to measure electrical responses from the electrodes of the system at 202. Additionally or alternatively, the system may trigger an alarm, shut down, alter flow control of the aqueous sample, or the like. However, if, at 205, a pH of the aqueous sample may be determined, the system may output the pH of an aqueous solution. An output may be in the form of a display, storing the data to a memory device, sending the output through a connected or wireless system, printing the output, or the like. The system may be automated, meaning the system may automatically output the identified pH. The system may also have associated alarms, limits, or predetermined thresholds. For example, if a measured pH reaches a threshold, the system may trigger an alarm, adjust the pH of the aqueous solution, alter the flow of the aqueous solution, or the like. Data may be analyzed in real-time, stored for later use, or any combination thereof.

Figure 7:
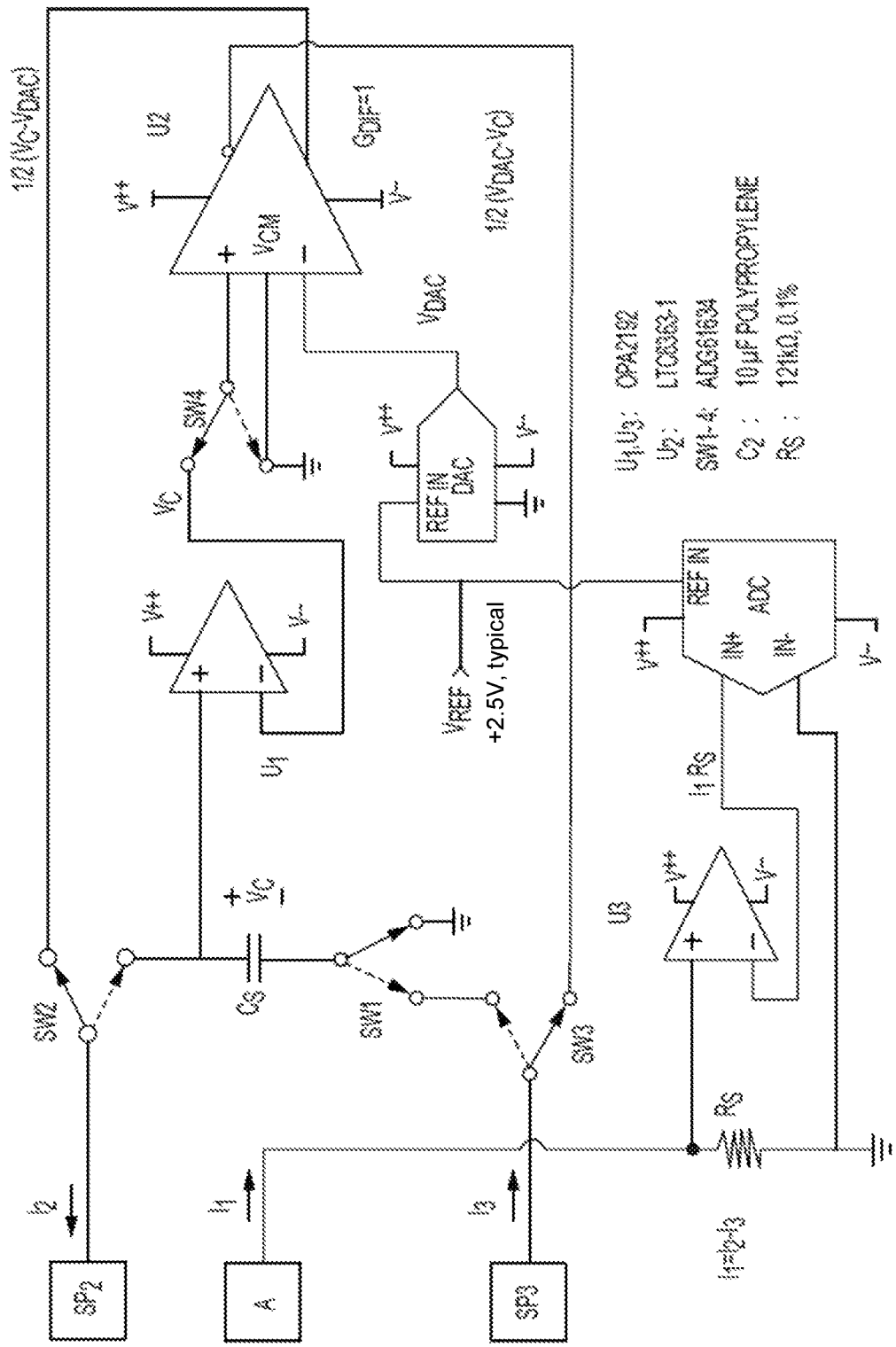
FIG. 7 illustrates an example circuitry with reference offset cancellation of pH measurement in an aqueous sample.
Figure 8:
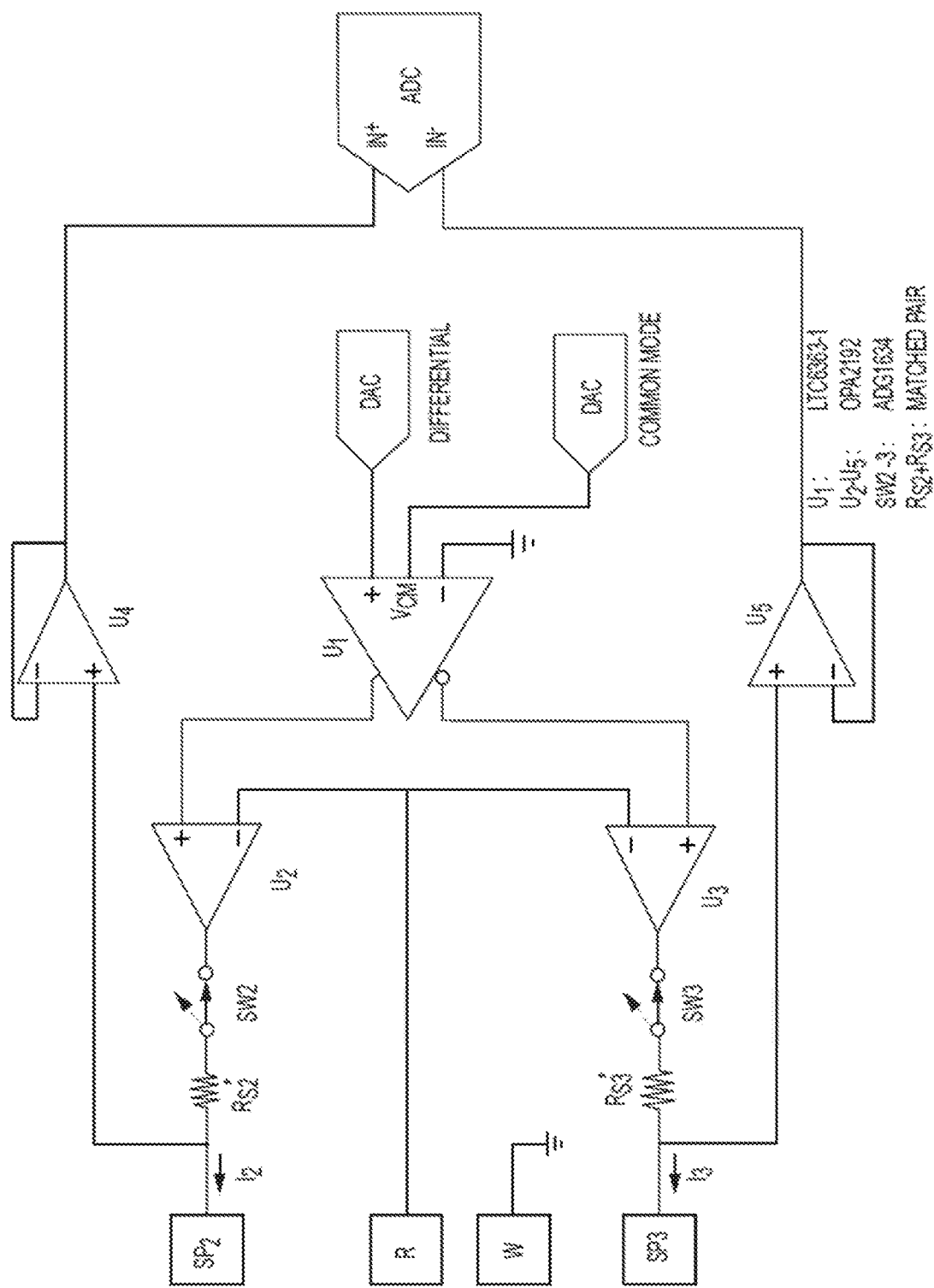
FIG. 8 illustrates another example circuitry with reference offset cancellation of pH measurement in an aqueous sample.

Referring to FIG. 7 and FIG. 8, circuitry may control the electrical signal and or measurement (e.g., current, voltage, etc.) to one or more series of electrodes such that different electrical signals may be applied and/or measured with respect to the volume of aqueous solution. In an embodiment the first measurement electrode and second measurement electrode may be connected to a solid state differential pH measurement circuitry with internal referencing. In the case that multiple or a series of electrodes are included in the system, each electrode may correspond to a different electrical signal value. For example, a first electrode may correspond to a first electrical signal value, a second electrode may correspond to a second electrical signal value, and the like. Each of these different electrical signal values may provide an electrical signal that will measure the interferants and/or pH of an aqueous sample. Thus, as the system provides electrical signals to each of the electrodes in series, the system may apply different electrical signals to or measure different electrical signals at the single electrode. In either case, after each application of an electrical signal, the system may measure the pH of the aqueous solution. Other electrodes may be included to complete the electrical circuit or to provide a reference electrode for measurement, for example, ground electrodes, multiple measuring electrodes, or the like. The circuitry of FIG. 7 and FIG. 8 are example embodiments and not meant to be limiting. The circuitry of FIG. 7 represents an example embodiment for BDD voltammetry with reference offset cancellation. The circuitry of FIG. 8 illustrates an example embodiment for BDD voltammetry with differential measurement of resting potential and response current.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device such as illustrated in FIG. 1, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring pH in an aqueous sample with a frit-less electrode, comprising:
    introducing an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode, wherein the second measurement electrode comprises an analyte and interferant sensitive material;
    measuring a first electrical potential between the first measurement electrode and the ground rod electrode in the aqueous sample;
    measuring a second electrical potential between the second measurement electrode and the ground rod electrode in the aqueous sample; and
    identifying a pH of the aqueous sample based upon a difference between the first electrical potential and the second electrical potential.

2. The method of claim 1, wherein the first measurement electrode comprises a Sp3 boron doped diamond material.

3. The method of claim 1, wherein the first measurement electrode comprises a material that is analyte insensitive and interferant sensitive.

4. The method of claim 1, wherein the second measurement electrode comprises a Sp2/Sp3 boron doped diamond material.

5. The method of claim 1, wherein the first electrical potential is attributable to interferants in the aqueous solution.

6. The method of claim 1, wherein the second electrical potential is attributable to both interferants in the aqueous solution and a pH of the aqueous solution.

7. The method of claim 1, wherein the identifying comprises subtracting the second electrical potential from the first electrical potential.

8. The method of claim 1, wherein the method does not require a frit or a reference solution.

9. The method of claim 1, wherein the first measurement electrode and second measurement electrode are in electrical communication to a solid state differential pH measurement circuitry with internal referencing.

10. A measurement device for measuring pH in an aqueous sample with a frit-less electrode, comprising:
    at least one chamber;

one or more series of electrodes at least partially disposed within the at least one chamber;
a processor; and
a memory device that stores instructions executable by the processor to:
introduce an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode, wherein the second measurement electrode comprises an analyte and interferant sensitive material;
measure a first electrical potential between the first measurement electrode and the ground rod electrode in the aqueous sample;
measure a second electrical potential between the second measurement electrode and the ground rod electrode in the aqueous sample; and
identify a pH of the aqueous sample based upon a difference between the first electrical potential and the second electrical potential.

11. The device of claim 10, wherein the first measurement electrode is a Sp3 boron doped diamond electrode.

12. The device of claim 10, wherein the first measurement electrode comprises a material that is analyte insensitive and interferant sensitive.

13. The device of claim 10, wherein the second measurement electrode comprises a Sp2/Sp3 boron doped diamond material.

14. The device of claim 10, wherein the first electrical potential is attributable to interferants in the aqueous solution.

15. The device of claim 10, wherein the second electrical potential is attributable to both interferants in the aqueous solution and a pH of the aqueous solution.

16. The device of claim 10, wherein the identifying comprises subtracting the second electrical potential from the first electrical potential.

17. The device of claim 10, wherein the first measurement electrode and second measurement electrode are in electrical communication to a solid state differential pH measurement circuitry with internal referencing.

18. A computer program product for use with a processor in measuring pH in an aqueous sample with a frit-less electrode, comprising:
a storage device having code stored therewith, the code being executable by the processor and comprising:
code that introduces an aqueous sample into a measurement device comprising at least three electrodes, wherein at least one electrode of the at least three electrodes comprises a ground rod electrode, wherein at least one electrode of the at least three electrodes comprises a first measurement electrode, and wherein at least one electrode of the at least three electrodes comprises a second measurement electrode, wherein the second measurement electrode comprises an analyte and interferant sensitive material;
code that measures a first electrical potential between the first measurement electrode and the ground rod electrode in the aqueous sample;
code that measures a second electrical potential between the second measurement electrode and the ground rod electrode in the aqueous sample; and
code that identifies a pH of the aqueous sample based upon a difference between the first electrical potential and the second electrical potential.

* * * * *